Figure 1:
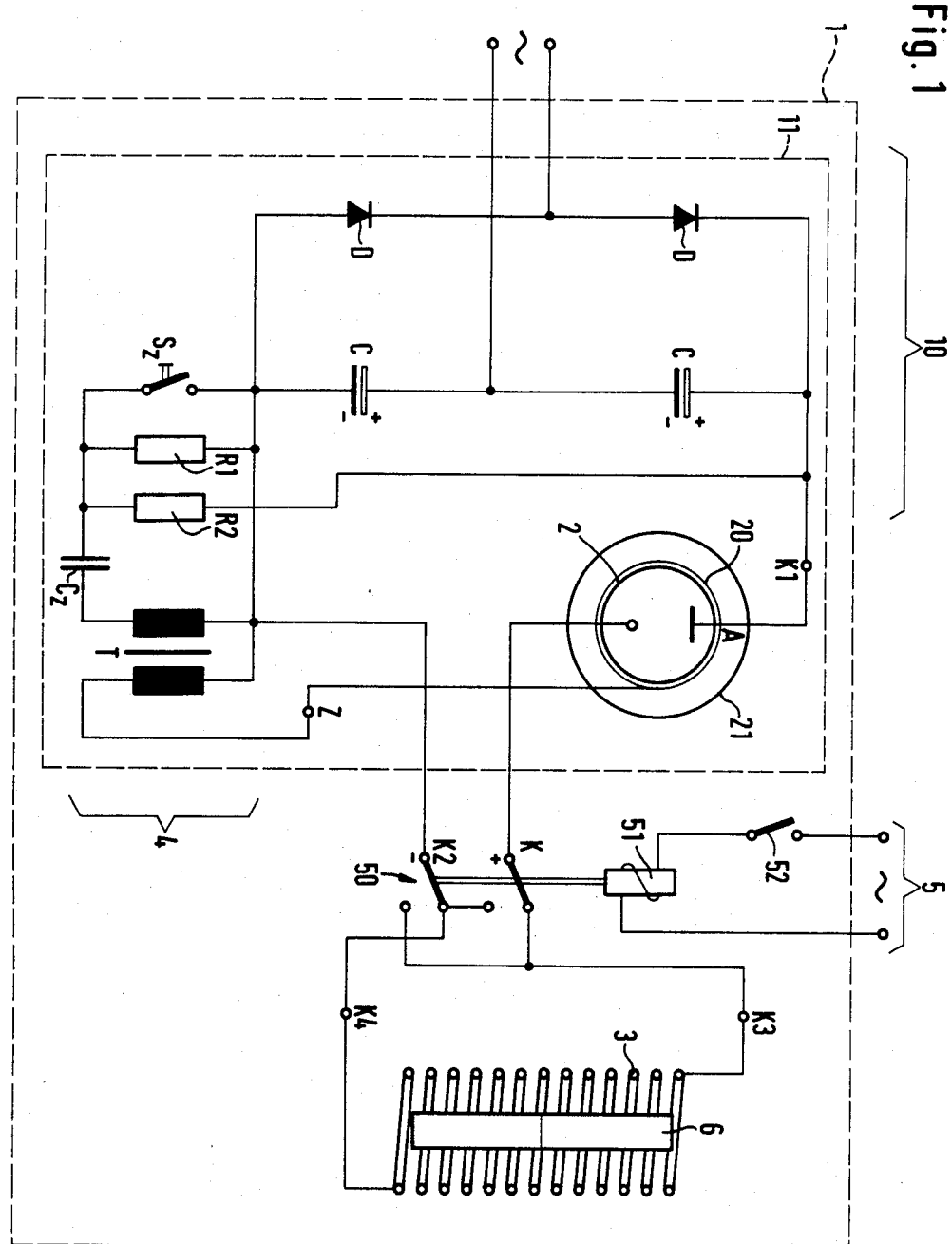

United States Patent [19]

Hurtig

[11] Patent Number: 4,497,011
[45] Date of Patent: Jan. 29, 1985

[54] SWITCHING APPARATUS FOR CHANGING THE ABSOLUTE VALUE AND THE PERMANENT MAGNETIZATION DIRECTION OF FERROMAGNETIC BODIES, E.G. OF PERMANENT MAGNETS

[76] Inventor: Karl Hurtig, Moortwiete 68, 2086 Ellerau, Fed. Rep. of Germany

[21] Appl. No.: 459,601

[22] PCT Filed: May 5, 1982

[86] PCT No.: PCT/DE82/00096
§ 371 Date: Jan. 13, 1983
§ 102(e) Date: Jan. 13, 1983

[87] PCT Pub. No.: WO82/04160
PCT Pub. Date: Nov. 25, 1982

[30] Foreign Application Priority Data
May 14, 1981 [DE] Fed. Rep. of Germany ....... 3119435

[51] Int. Cl.³ ............................................. H01H 47/30
[52] U.S. Cl. ..................................... 361/147; 361/156
[58] Field of Search ............... 361/147, 149, 155, 156, 361/205

[56] References Cited
U.S. PATENT DOCUMENTS

| | | |
|---|---|---|
| 2,247,745 | 7/1941 | Brader . |
| 2,287,543 | 6/1942 | Vang . |
| 2,786,970 | 3/1957 | Connoy ........................... 361/149 X |
| 3,959,688 | 5/1976 | Bonazoli . |
| 4,354,218 | 10/1982 | Steingroever et al. ............. 361/147 |
| 4,399,482 | 8/1983 | Inoue .............................. 361/156 X |

FOREIGN PATENT DOCUMENTS

| | | |
|---|---|---|
| 1253726 | 1/1961 | France . |
| 485926 | 5/1938 | United Kingdom . |

Primary Examiner—Reinhard J. Eisenzopf
Attorney, Agent, or Firm—Edward F. Levy

[57] ABSTRACT

A switching unit (1) for changing the polarity or the magnetic field-strength of ferromagnetic bodies, for example of permanent-magnet clamping devices, possesses a series-arrangement comprising at least one coil (3) which is suitable for receiving ferromagnetic bodies (6), a controllable electronic switch, and an energy-storage system (10). The object is to provide a compact switching unit which switches reliably and which possesses a simple electrical circuit. This object is achieved by means of a switching unit which comprises an electronic switch, in the form of a flashlamp (2).

20 Claims, 5 Drawing Figures

SWITCHING APPARATUS FOR CHANGING THE ABSOLUTE VALUE AND THE PERMANENT MAGNETIZATION DIRECTION OF FERROMAGNETIC BODIES, E.G. OF PERMANENT MAGNETS

The invention relates to a switching unit for changing the absolute value and the direction of the permanent magnetization of ferromagnetic bodies, for example of permanent magnets, this unit possessing a circuit for generating current-pulses which comprises an energy-storage system, a firing circuit and a controllable electronic switch, this electronic switch being designed in the form of a gas-discharge tube, and possessing a firing electrode, this switching unit also possessing at least one coil which is suitable for receiving the ferromagnetic body and is connected to the circuit for generating current-pulses, and further relates to a permanent-magnet clamping device for clamping workpieces which can be attracted magnetically, this clamping device possessing a plurality of permanent magnets which are, with respect to their poles, arranged side-by-side and separated by walls.

In order to polarize a permanent magnet, or to alter its polarity, in particular to reverse its polarity, a magnetic body must be briefly subjected to a strong magnetic field, directed in the direction counter to the existing polarity. A strong, short-lived magnetic field of this nature can be generated in a coil, for example an air-core coil, when a high current, in the form of a pulse, flows through this coil. For generating the pulse-current, an arrangement is known from German Auslegeschrift No. 1,054,581, this arrangement possessing capacitors as energy-storage devices and a series-connected circuit assembly comprising a discharge tube and the coil, this circuit assembly being connected in parallel to these capacitors. A discharge tube of this type, known, for example, as a thyratron, or as an ignitron, functions as a controllable gas-filled electrical valve, that is to say as an electronic switch for discharging the energy-storage devices, and is an elaborately constructed current-gate comprising a thermionic cathode, a coolant-coil, a control grid and control anodes, as well as further valve-elements, such as, for example, specially shaped surfaces. This pulse-generation circuit for changing or reversing the polarity of a ferromagnetic body is complicated in terms of its design, is bulky and, in consequence, is relatively expensive. As mentioned, special measures must be taken for cooling a thyratron or ignitron, for example a cooling system employing water.

Attempts have, moreover, been made to generate the high pulse-currents by means of a thyristor circuit, instead of a thyratron. This results in a unit which is likewise very bulky overall, and which is incapable of the sudden generation of the high currents which are necessary. On the contrary, when thyristors are used, it is necessary, for a single polarity-reversal, to switch them at least three to four times more frequently and moreover, as a rule, to switch them ten times more frequently. This frequent switching correspondingly shortens the service lives of thyristor units of this type.

The object of the invention is to provide a switching unit for temporarily changing the magnetic field strength of a ferromagnetic body, this switching unit to be as compact as possible in terms of its construction, to be capable of implementation by means of a simple electrical circuit, and in which unit the energy-storage devices can be repeatedly discharged at high power, while the unit has, at the same time, a long service life.

This object is achieved, in a switching unit of the type initially mentioned, in that the gas-discharge tube is a flashlamp, of a short type, which is designed for high gas pressures. The flashlamp is an electronic component which is constructed in accordance with a simple design, with small volumetric measurements, so that it can be integrated into the switching unit in a space-saving manner. The lamp can switch the power required for reversing the polarity of a ferromagnetic body, without cooling of any kind, and can be manufactured at a cost which is low in comparison to a thyratron. The number of switching operations which can be achieved with the flashlamp is so high that its serviceability is assured for several years. A switching unit of this type, the electronic switch of which is formed by the flashlamp, is hence suitable, to a special degree, for permanent-magnet clamping devices for clamping workpieces which can be attracted magnetically, of the type which has likewise been described in the introduction, since a large number of switching operations must be guaranteed in the case of clamping devices of this type. The essential components of the switching unit are defined only by the number of energy-storage devices which must be provided for the switching power, and by the flashlamp, the latter being of simple construction. For example, in the case of a charging voltage of 600 V, eight capacitors each of 1,000 $\mu$F, form an energy-storage device which is adequate for generating the switching power for a magnetic clamping plate having an overall size of approximately 20×45 cm. The energy-storage circuit can be constructed in any conventional manner, for example with capacitors and rectifiers, this circuit being connected parallel to the series-connected circuit assembly which is formed by the flashlamp and the coil. The firing device, for firing the lamp, is also constructed in a simple manner. Special electrical precautions, in particular auxiliary circuits of any kind, for the switching operation of the lamp, and a cooling system, such as are needed according to the state of the art, are unnecessary. For this reason, the switching unit is, in terms of its mechanical design, easy to implement, with comparatively few electronic components. Furthermore, with the reduced flashover distance, the internal resistance which develops in the flashlamp, after firing, is so low that a particularly high pulse-current is obtained for the purpose of generating a strong magnetic field in the coil. The flashover length also determines the time taken by the flash in the lamp to decay, so that the pulse-duration can, with a short flashover distance, be kept very small. Changing the light-emission from the flashlamp by shortening its flashover distance has no significance, since the lamp functions, according to the invention, as an electronic switch. On the other hand, the functional reliability of the flashlamp, that is to say, in the first instance, the avoidance of self-firing, especially if the flashover distance is short and/or the anode/cathode blocking voltage is high, can be assured, to a special degree, by the fact that the flashlamp is structurally designed for the high gas pressures which develop inside it. This can be achieved, in a very advantageous manner, by developing, for the glass body, a shape having favourable static-stress characteristics, to which high pressures can be applied, by using a particularly pressure-resistant material, such as, for example, quartz glass, and/or as a result of endowing the glass body with a pronounced wall thickness.

Expedient embodiments of the gas-discharge lamp according to the invention include configurations wherein the flashlamp comprises a firing electrode in the form of a transparent, electrically conducting coating which is applied to its surface, and/or a firing wire which is located at its periphery, it being possible, for example, to provide this firing wire in the form of a nickel wire winding. The firing electrode can also be designed as a grid inside the lamp. The design of the firing electrode can thus be matched, in each case, to the method employed for manufacturing the flashlamp, and/or can be executed with reference to specific electrical characteristics related to the firing process.

In order to prevent the flash of light, occurring as the flashlamp completes the circuit, from being perceived visually, and thereby to prevent adverse effects on the operating personnel, the lamp can be surrounded by a non-reflecting opaque light-mask.

In order to ensure that the flashlamp has a particularly long service life, it can be a quartz-glass flash-tube filled with a xenon mixture. Quartz-glass tubes are particularly heat-resistant, thus avoiding haircracks which would lead to the escape of the gas.

In order to reverse the polarity of the ferromagnetic body, in particular of a permanent magnet, which is inserted into the coil, and to effect this repeatedly, without rotating the magnet in space and with the magnet remaining in the same position in the coil, another expedient embodiment of the invention takes the form of a configuration wherein the switching unit possesses a circuit for reversing the polarity of the coil connections, with an additional circuit for generating current-pulses, which comprises a second electronic switch, this electronic switch being designed in the form of a flashlamp, the mutually corresponding pairs of output terminals of the two circuits for generating current-pulses being connected to the coil connections in a manner whereby the output terminals of a given pair are connected to opposite coil connections. Instead of the second circuit for generating current-pulses, which is connected to the coil connections in a manner whereby its polarity is reversed with respect to the first pulse-generation circuit, it is possible to use, for example, a relay-controlled reversing switch for reversing the pulse-current through the coil, or coils. However, the contacts of a reversing switch of this type are located in the pulse-current circuit, so that they must be of high-quality design, and are correspondingly expensive. In contrast, the second circuit for generating current-pulses enables mechanical contacts carrying high electrical loads to be avoided. Due to the fact that the flashlamp has both small overall dimensions and a simple electrical circuit, a correspondingly small-sized, compact and, at the same time, functionally reliable switching unit is obtained even when two flashlamps are used.

In order to provide a strong magnetic field in the coil, with reference to the desired magnetization of the ferromagnetic body located therein, a further advantageous embodiment of the invention envisages that the switching unit comprises an arrangement for setting the magnitude of the energy to be stored, the flashlamp, or flashlamps, being switchable, to complete the circuit, when the stored energy reaches the set magnitude. By this means, the flashlamp can be discharged by means of energy-storage devices which have been charged to different energy-levels, in a power-range which is adequate for the control process. In this manner, not only is it possible to reverse the polarity of a ferromagnetic body in the coil, but it is also possible to intensify the magnetization of the body in a controlled manner, or to weaken the magnetization, if appropriate, even to zero.

The invention can be applied, in a particularly advantageous manner, to machine-tool clamping devices, which are used for clamping workpieces which can be attracted magnetically, the main requirements relating to these clamping devices being that they should have the smallest possible overall dimensions, that they should be inexpensive to manufacture, and that they should be functionally reliable. Known permanent magnet-clamping devices of this type conventionally comprise a plurality of permanent magnets which are, with respect to their poles, arranged side-by-side and separated by walls, of which every second magnet is surrounded by an air-core coil and is capable of undergoing pole-reversal as a result of the application of a pulse-current to the coil, a circuit for reversing the polarity of the coil connections being provided for the purpose of repeated pole-reversal, while the permanent magnets which are located between each successive pair of pole-reversible magnets are unalterable with respect to their polarity, while these clamping devices possess, in addition, the switching unit for generating and switching the pulse-current, this unit comprising the energy-storage system and the controllable electronic switch. As a result of the design of the electronic switch, as a flashlamp, according to the invention, a clamping device of this type can be designed within particularly small dimensions, while it incorporates, for its switching operation, an electrical circuit which is exceptionally simple.

Figure 2:
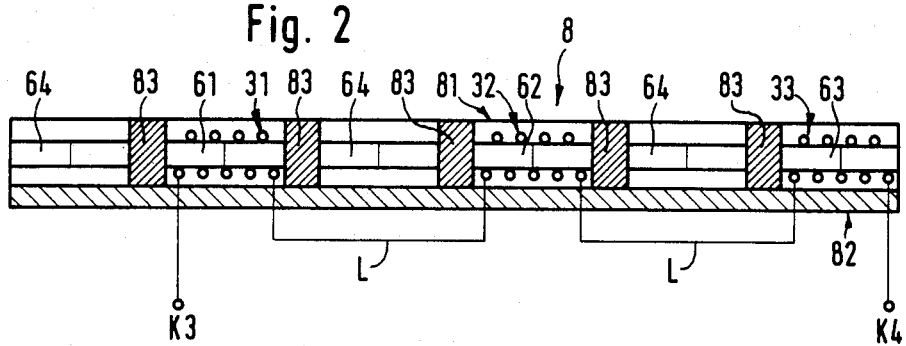
Figure 3:
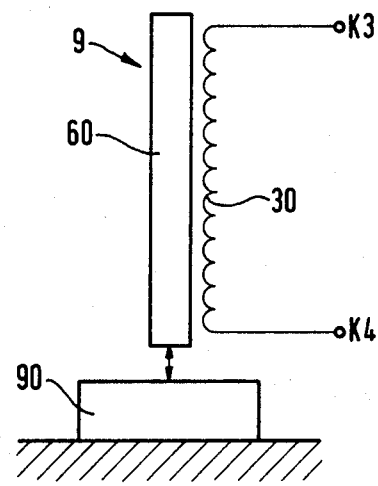
Figure 4:
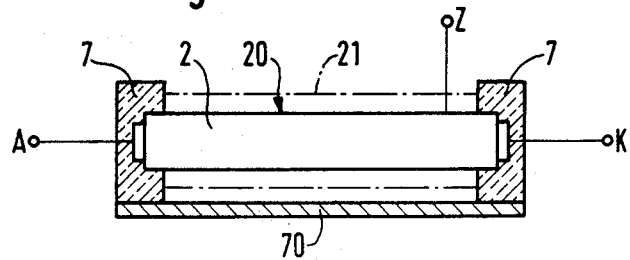
Figure 5:
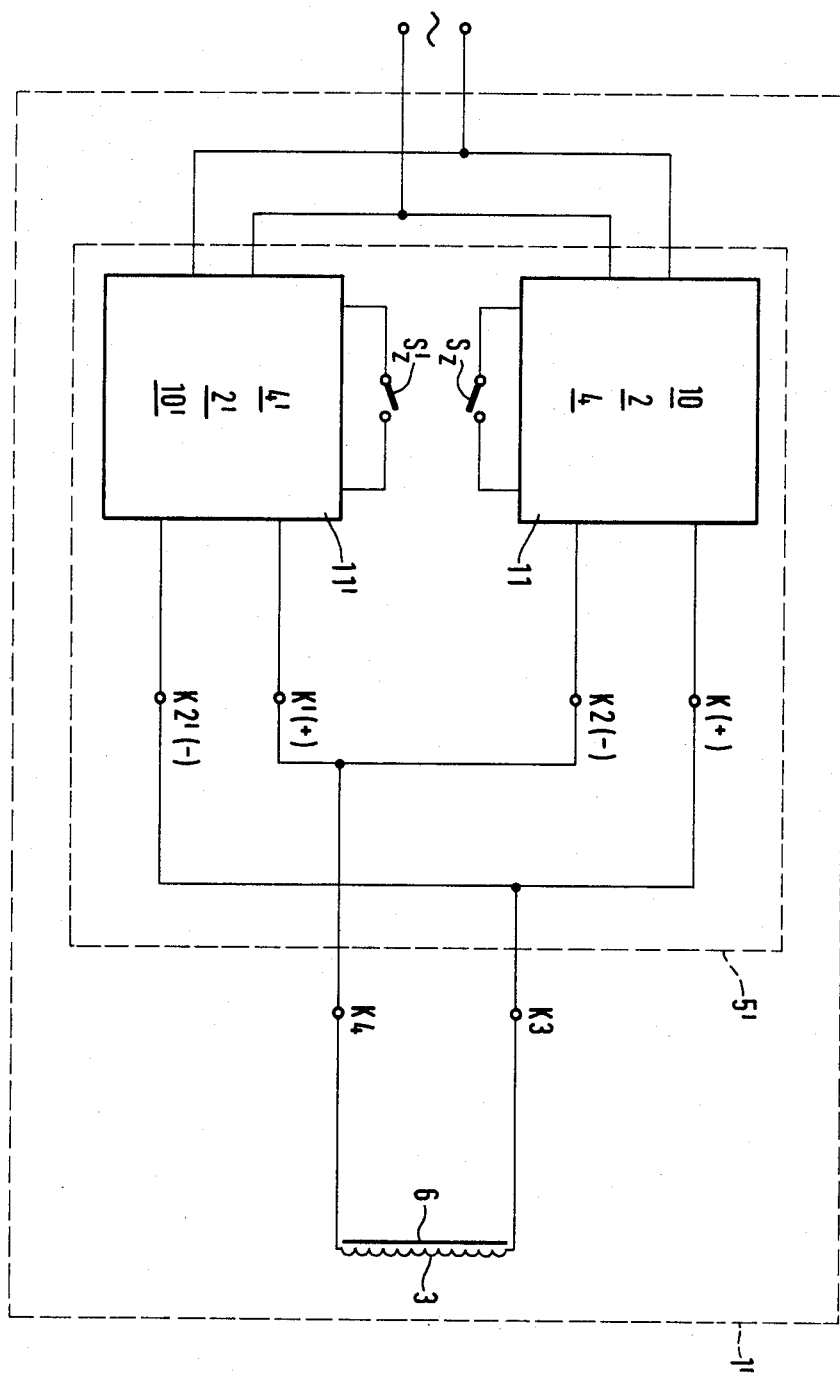

In the text below, illustrative embodiments of the invention are explained in more detail, by reference to the diagrammatic drawings, in which:

FIG. 1 shows, by reference to a circuit, one construction of a switching unit employing a flashlamp, FIG. 2 shows a modified portion of the unit shown in FIG. 1, for the purpose of forming a magnetic clamping plate, FIG. 3 shows a modified portion of the unit shown in FIG. 1, for a load-lifting magnet, FIG. 4 shows a simplified representation of a flashlamp, and FIG. 5 shows a further illustrative embodiment of the switching unit according to the invention.

FIG. 1 shows the arrangement of a flashlamp 2 in a switching unit 1, this flashlamp being of a short type which is designed for high gas pressures. Electrolytic capacitors C are used as the energy-storage system 10, these capacitors being charged to their charging voltage, appropriate to the case in question, which can lie, for example, in the range from approximately 150–600 V, by means of charging diodes D which are connected to a source of alternating voltage (e.g. 220 V). The series-connected circuit assembly, comprising the flashlamp 2 and an aircore coil 3, is connected to the output terminals K1 and K2 of the energy-storage system 10. A firing circuit 4, for the flashlamp 2, comprises a capacitor $C_z$, ohmic resistances R1 and R2, a transformer T and a press-button switch $S_z$. One secondary terminal Z of the transformer T is connected to an electrically conducting coating 20, applied to the flashlamp 2, it being possible for this coating to be vapor-deposited, and/or applied as a lacquer. In the series-connected circuit assembly, comprising the flashlamp 2 and the air-core coil 3, the polarity of the coil connections, K3 and K4, can be reversed by means of a reversing device 5. In this device, the terminals of a relay 51 are connected to a reversing switch 50, the input terminals of this reversing switch being connected to the output connections K and K2 of the circuit 11 of the switching unit 1, this circuit comprising the energy-storage system 10, the flashlamp 2, and the firing circuit 4, and serving the function of generating the current-pulses. A source of alternating voltage and a control switch 52 are located in the control circuit of the relay 51. A permanent magnet 6 is positioned in the air-core coil 3. In order to increase the energy which can be stored by the energy-storage system 10, it is possible, in each case, to connect additional capacitors in parallel to the capacitors C, these additional capacitors being omitted from the diagram.

In order to generate, for a short time, a strong magnetic field in the air-core coil 3, an appropriately high pulse-current is applied to this coil. In order to generate the pulse-current, the energy-storage devices, that is to say, the electrolytic capacitors C, are charged, so that the sum of the capacitor charging-voltages is present across the anode and cathode of the flashlamp 2. By briefly closing the press-button switch $S_z$, the firing capacitor $C_z$, previously charged via the resistors R1 and R2, is instantaneously discharged. The voltage pulse, occurring as this capacitor is discharged, is transformed by means of the transformer T, into a high-voltage pulse, on the secondary side, this pulse being applied to the electrically conducting coating applied to the flashlamp, so that the gas in the lamp 2 is ionized, or fired. The firing voltage amounts, for example, to approximately 2 kV. During the firing process, the internal resistance of the flashlamp 2 changes abruptly, from infinity to a very low value (e.g. a few milliohms), this value being determined by the characteristics of the flashlamp 2. As a result of this completion of the circuit, by the flashlamp, from the blocked condition to the conducting condition, a large, short-lived current pulse is produced, which can lie within the range from approximately 50 to 300 A, depending on the charging-voltage level. The pulse-current flows through the air-core coil 3 which is connected in series with the flashlamp 2 and generates, in this coil, a strong, short-lived electromagnetic field. By this means, the polarity of the permanent magnet 6, located in the air-core coil 3, is reversed. In this process, the magnetic field which is, for a short time, generated in the coil 3 acts counter to the field of the permanent magnet 6.

In order to bring about, at a later point in time, a corresponding reversal of the newly created polarity of the permanent magnet 6, it is possible either to rotate this magnet through 180°, in the drawing-plane of FIG. 1, or to interchange the connections to the air-core coil 3 by switching-over the reversing switch 50. In the latter case, the advantage is gained, whereby the permanent magnet 6 does not need to be removed from the air-core coil 3, rotated, and replaced in this coil. During the discharge of the capacitors C, the short-lived conducting condition of the flashlamp 2 is terminated when the voltage between the terminals K1 and K2 falls below a defined value, when the blocked condition of the lamp 2 is regained. Using the circuit indicated in FIG. 1, it is possible to carry out switching operations at intervals of approximately 30 to 40 seconds. Should a more rapid succession of switching operations be desired, the charging of the electrolytic capacitors can be briefly interrupted, in a conventional manner, so that the lamp can return more rapidly to its high-resistance condition.

The switching unit 1 can also comprise an arrangement for setting the magnitude of the energy to be stored, this arrangement being omitted from FIG. 1. Appropriate control-circuits are known and are not a subject of the invention. It is essential, however, that the flashlamp according to the invention be capable of being switched to the conducting condition in a voltage range which is suitable for regulating and/or setting the pulse-current which is to be switched. It is thus possible, in a deliberate manner, to set and carry out a weak change, or a pronounced change (pole-reversal) in the magnetization of the ferromagnetic body, as well as even to demagnetize it.

The length of the flashlamp determines the magnitude of the internal resistance when in the conducting condition, as well as the time taken by the flash to decay. The short design of the lamp 2 enables a high pulse-power to be obtained, that is to say, to render the pulse-current particularly large and particularly short-lived. The flashlamp is designed for high gas-pressures, in order to enable the anode/cathode blocking voltage to be particularly large, without there being any risk of the lamp 2 firing spontaneously. A flashlamp with a very short flashover distance and a particularly high gas-pressure thus has particularly good switching characteristics, as a result of which a very strong and particularly short-lived magnetic field is generated in the coil.

The use of quartz glass for the flashlamp enables the formation of hair-cracks to be prevented, in an effective manner, and enables the service life of the lamp to be increased by a considerable amount. The lamp 2 can be surrounded by a non-reflecting, opaque light-mask 21 (see FIG. 1). This light-mask 21 screens off the light-emission which occurs during the process of flashing, that is to say during the process of completing the circuit, thus preventing the flash-light from being perceived in a disturbing manner. However, it is also possible to use a casing of the switching unit 1 as a light-mask, either additionally or on its own, this casing being closed in an appropriately lightproof manner.

A magnetic clamping plate 8 is shown, in section, in FIG. 2. Permanent magnets 64 are arranged in alternation with permanent magnets 61 to 63, in that the magnets are located one after another, pole-to-pole in each case. The poles of two adjacent magnets are separated by a wall 83. The permanent magnets 64 have a polarity which is permanent, and which is incapable of being changed. The permanent magnets 61, 62 and 63 are surrounded by air-core coils, 31, 32 and 33 respectively. These air-core coils, 31 to 33, are connected in series via leads L. The connections of the series-connected circuit assembly are connected to the terminals K3 and K4 of the circuit shown in FIG. 1. The magnets and walls 83 are mounted on a plate 82 of the clamping device 8. The surface 81 of the magnetic clamping plate 8 forms the support for a workpiece which can be attracted magnetically, but which is not represented.

The magnets 61, 62 and 63 which are positioned in the air-core coils 31, 32 and 33 are, in each case, capable of undergoing polarity-reversal, since the series-connection of the air-core coils lies, via the terminals K3 and K4, in series with the flashlamp 2 shown in FIG. 1. In this case, prior to each actuation of the firing button $S_z$, the reversing switch 50 is switched over, by operating the press button 52 so that a strong, short-lived magnetic field is generated in each of the air-core coils, 31, 32 and 33, in each case counter to the polarity, existing at that moment, of the permanent magnets 61, 62 and 63. The switches $S_z$ and 52 can be designed as a common switching element, during the actuation of which the switch 52 is closed or opened before the switch $S_z$ is closed. When adjacent poles of the magnets, for example of the magnets 64 and 61, are of identical polarity, a magnetic field is present which, acting through the wall 83, is led to the surface 81 of the magnetic clamping plate 8. In this operating condition, a workpiece which is brought on to the surface 81 is magnetically attracted, and is firmly held, or clamped, in its position. By reversing the polarity of the magnets 61, 62 and 63, the magnets 64 and 61, 64 and 62, and 64 and 63 lie opposite one another with their respective poles in opposition, so that there is no magnetic field in the wall 83 in the region of the surface 81. As a result, a workpiece which had previously been attracted is released. It is possible, by regulating the level of the pulse-current, in the manner previously described, to set the field strengths of the pole-reversible permanent magnets 61, 62 and 63 in a manner precisely such that a very thin and sheet-like workpiece is not deformed on being clamped. This condition is obtained by setting a comparatively low pulse-current for the reverse-magnetization. Conversely, a particularly high pulse-current is set in the case of comparatively large, solid workpieces, so that the magnetic fields of the permanent magnets 61, 62 and 63 are correspondingly enhanced, thus producing high holding forces.

FIG. 3 represents a load-lifting magnet 9, with a winding 30 forming the coil, and a core 60, the latter being made of a magnetic material. The connections to the winding 30 are connected to the terminals K3 and K4 of the circuit shown in FIG. 1. A load-lifting magnet 9 of this type can be employed, for example, in an industrial robot. In such an application, it is important to magnetize, or demagnetize, the core 60 as rapidly as possible, in order to attract, magnetically, a workpiece or component 90, in a deliberate manner, or to repel or deliver it in a like manner. Since the switching unit according to the invention is of simple design, both mechanically and structurally, it can be employed, with particular advantage, in an industrial robot for the abovementioned function.

The retention of a flashlamp 2, in ceramic insulators 7, is shown in FIG. 4, these insulators being located on a mounting plate 70. An electrically conducting coating 20 is vapor-deposited on to the surface of the flashlamp 2, this coating being connected to the secondary terminal Z of the firing-transformer T according to FIG. 1. In order to prevent the flash-light, generated when the lamp is fired, from radiating outwards, the lamp is surrounded by a mask 21 which is designed, for example, with an annular shape. Care must be taken, of course, to ensure that this mask 21 is located at an adequate distance from the glass housing of the lamp 2, in order to avoid instances of overheating and consequent damage to the switching unit.

FIG. 5 represents a switching unit 1' possessing a circuit or arrangement 5' for reversing the polarity of the coil connections K3 and K4. In addition to the circuit 11 for generating current-pulses, as has already been described in detail by reference to FIG. 1, the circuit 5' comprises a second, identical circuit 11' for generating current-pulses, which correspondingly possesses an energy-storage system 10', a flashlamp 2', and a firing-circuit 4'. The output terminal K (cathode) of the circuit 11 and the output terminal K2 of the circuit 11' are connected to the coil connection K3, while the output terminal K2 of the circuit 11' and the output terminal K' (cathode of the second flashlamp 2') are connected to the coil connection K4. The firing button $S_z$ is provided for the firing-circuit 4, and a firing button $S'_z$ is correspondingly provided for the firing circuit 4'. The circuits 11 and 11' are supplied from a common source of alternating voltage.

With the switching unit 1', the pulse-current through the coil 3 can be produced, in the manner described above, either by means of the circuit 11, by closing the press button $S_z$, or according to choice, by means of the circuit 11', by actuating the press button $S'_z$. With this arrangement, the two pulse-currents flow through the coil 3 in opposite directions. Correspondingly, the polarity of the permanent magnet 6, in the coil 3, is reversed by alternately actuating the firing-buttons $S_z$ and $S'_z$, without having to remove the permanent magnet 6 from the coil 3, rotate it and replace it in the coil. With the arrangement shown in FIG. 5, the relay-controlled reversing switch 50, shown in FIG. 1, is dispensed with. The special advantage of the illustrative embodiment, according to FIG. 5, for reversing the polarity of the coil connections K3 and K4 resides in the fact that no moving (reversing) contacts are present in the pulse-current circuit, which must be of very high quality in order to prevent rapid wear and/or unsatisfactory contacting. Due to the fact that the flashlamp 2, and/or 2', has small overall dimensions and is simple to operate in electrical terms, it is still possible to produce the switching unit 1', with two circuits 11 and 11' for generating current-pulses, with compact dimensions, and to do so in a simple and inexpensive manner.

It can also be particularly expedient to design portions of the circuits 10, 4 and 10', 4', for the circuits 11 and 11' in a common manner. Furthermore, it is also possible for the circuits 11 and 11' to be connected to different sources of alternating voltage, and/or to comprise a common system, or correspondingly assigned, different systems, for setting the magnitude of the energy to be stored.

An energy-storage system for the switching unit can likewise comprise energy-storage devices in the form of inductances instead of capacitors, or can be constructed with other suitable, known means for storing electrical energy. Moreover, the firing device can be designed in any manner which is suitable for generating a high-voltage firing pulse.

I claim:

1. A switching unit (1) for changing the absolute value and the direction of the permanent magnetization of ferromagnetic bodies such as permanent magnets, said unit comprising
(a) circuit means for generating current-pulses, and including
   (1) an energy-storage system (10) having means for connection to an electrical power source,
   (2) firing circuit means (4) connecting said energy-storage system to a first output terminal (K2), and
   (3) controllable electronic switch means (A) connecting said energy-storage system to a second output terminal (K), and comprising gas-discharge tube means (2) having an anode and a cathode, each having a respective terminal (K,K1), and also including firing electrode means (20), and
(b) at least one coil (3) adapted to receive a ferromagnetic body (6), said coil terminating at each end in connections (K3,K4) to said output terminals (K,K2), wherein said gas-discharge tube means comprises a flashlamp of a short type designed for high gas pressures and carrying said firing electrode means connected to said firing circuit means on the outside of said tube.

2. A switching unit according to claim 1 in which said firing electrode means includes a firing electrode in the form of a transparent, electrically conducting coating which is applied to the surface of said flashlamp.

3. A switching unit according to claim 2 in which said flashlamp is surrounded by a non-reflecting, opaque light mask (21).

4. A switching unit according to claim 2 in which said flashlamp is a quartz-glass flashtube filled with a xenon mixture.

5. A switching unit according to claim 1 in which said firing electrode means comprises a firing electrode in the form of a firing wire located at the periphery of said flashlamp.

6. A switching unit according to claim 5 in which said flashlamp is surrounded by a non-reflecting, opaque light-mask (21).

7. A switching unit according to claim 5 in which said flashlamp is a quartz-glass flashtube filled with a xenon mixture.

8. A switching unit according to claim 1 in which said flashlamp is surrounded by a non-reflecting, opaque light mask (21).

9. A switching unit according to claim 8 in which said flashlamp is a quartz-glass flashtube filled with a xenon mixture.

10. A switching unit according to claim 8 in which said switching unit includes a circuit (5') for reversing the polarity of said coil connections (K3,K4), and an additional circuit (11') for generating current-pulses and including a second electronic switch in the form of a second flashlamp (2'), the respective output terminals (K,K2 and K',K2') of the two pulse-generating circuits (11,11') being connected to said coil connections (K3,K4) in such a manner that the output terminals of a selected pulse-generating circuit are connected to opposite terminals of the coil.

11. A switching unit according to claim 10 in which said switching unit includes means for setting the magnitude of the energy to be stored, said flashlamp (2) being switchable, to complete the circuit, when the stored energy reaches the magnitude set by said magnitude-setting means.

12. A switching unit according to claim 8 in which said switching unit includes means for setting the magnitude of the energy to be stored, said flashlamp (2) being switchable, to complete the circuit, when the stored energy reaches the magnitude set by said magnitude-setting means.

13. A switching unit according to claim 1 in which said flashlamp is a quartz-glass flashtube filled with a xenon mixture.

14. A switching unit according to claim 13 in which said switching unit includes a circuit (5') for reversing the polarity of said coil connections (K3,K4), and an additional circuit (11') for generating current-pulses and including a second electronic switch in the form of a second flashlamp (2'), the respective output terminals (K,K2 and K',K2') of the two pulse-generating circuits (11,11') being connected to said coil connections (K3,K4) in such a manner that the output terminals of a selected pulse-generating circuit are connected to opposite terminals of the coil.

15. A switching unit according to claim 14 in which said switching unit includes means for setting the magnitude of the energy to be stored, each of said flashlamps (2,2') being switchable, to complete the circuit, when the stored energy reaches the magnitude set by said magnitude-setting means.

16. A swtiching unit according to claim 13 in which said switching unit includes means for setting the magnitude of the energy to be stored, said flashlamp (2) being switchable, to complete the circuit, when the stored energy reaches the magnitude set by said magnitude-setting means.

17. A switching unit according to claim 1 in which said switching unit includes a circuit (5') for reversing the polarity of said coil connections (K3,K4), and an additional circuit (11') for generating current-pulses and including a second electronic switch in the form of a second flashlamp (2'), the respective output terminals (K,K2 and K',K2') of the two pulse-generating circuits (11,11') being connected to said coil connections (K3,K4) in such a manner that the output terminals of a selected pulse-generating circuit are connected to opposite terminals of the coil.

18. A switching unit according to claim 17 in which said switching unit includes means for setting the magnitude of the energy to be stored, said flashlamp (2) being switchable, to complete the circuit, when the stored energy reaches the magnitude set by said magnitude-setting means.

19. A switching unit according to claim 1 in which said switching unit includes means for setting the magnitude of the energy to be stored, said flashlamp (2) being switchable, to complete the circuit, when the stored energy reaches the magnitude set by said magnitude-setting means.

20. A switching unit according to claim 1 in combination with a permanent magnet clamping device (8) for clamping workpieces which can be attracted magnetically, said clamping device carrying a plurality of permanent magnets arranged side-by-side with respect to their poles, with each alternate magnet (61,62,63) surrounded by an air-core coil (31,32,33) and being capable of undergoing pole-reversal as a result of the application of a pulse-current to said coil, said switching unit including a circuit for reversing the polarity of the connections of said coils for the purpose of repeated pole-reversal, the permanent magnets (64) located between said alternate magnets being unaffected by the pole-reversal action of said coils.

* * * * *